Sept. 8, 1959  F. T. HAMPE  2,902,736
ANCHORING DEVICE
Filed March 31, 1955
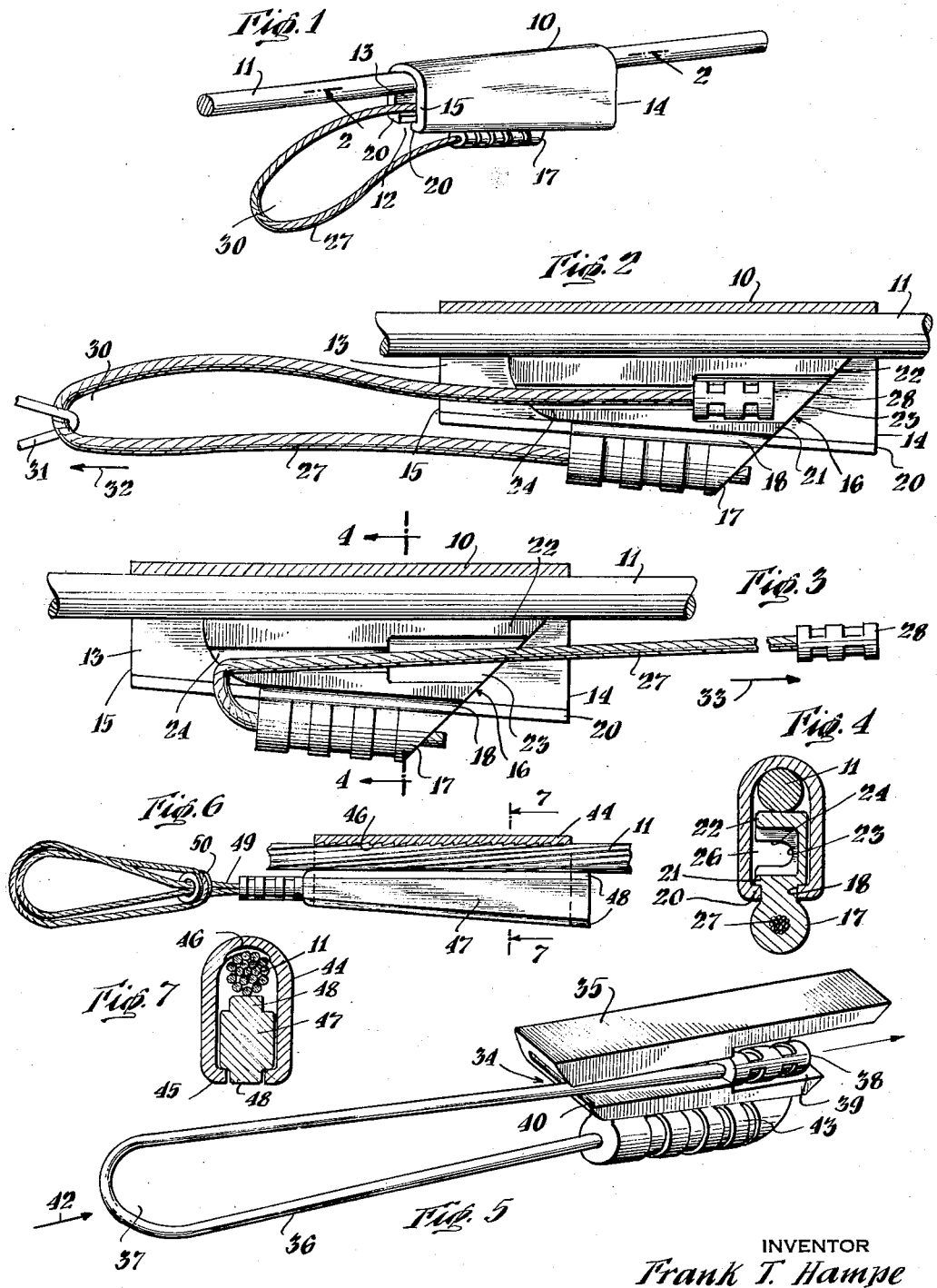
INVENTOR
Frank T. Hampe
BY Kane Dalsimer and Kane
ATTORNEYS

United States Patent Office 2,902,736
Patented Sept. 8, 1959

2,902,736

ANCHORING DEVICE

Frank T. Hampe, Poughkeepsie, N.Y., assignor to Fargo Mfg. Company, Inc., Poughkeepsie, N.Y., a corporation of New York Application March 31, 1955, Serial No. 498,282

1 Claim. (Cl. 24—126)

This invention relates to a structurally and funtionally improved anchoring device commonly known as a "Dead End" by means of which a wire or cable may have its end or body secured against detachment from a building, abutment or other displacement-preventing member.

It is a primarly object of the invention to furnish a structure which may be readily used without the exercise of special skills. So used, it is capable of being quickly coupled to or removed from a cable or anchoring structure. In use the greater the strain on the cable, the more the parts of the anchoring device will cooperate to prevent an accidental loosening of that cable.

Among other objects of the invention are those of furnishing a device of this type which will include relatively few parts each individually rugged and simple in design; such parts being susceptible to economical manufacture and when assembled furnishing a unitary apparatus which may be used for long periods of time with freedom from difficulties.

With these and other objects in mind, reference is had to the attached sheet of drawings illustrating practical embodiments of the invention and in which:

Fig. 1 is a perspective view of a cable section with the device applied thereto;

Fig. 2 is a sectional side view in enlarged scale and taken along the line 2—2 in the direction of the arrows as indicated in Fig. 1;

Fig. 3 is a view similar to Fig. 2 but showing certain parts of the assembly shifted to different positions;

Fig. 4 is a transverse sectional view taken along the line 4—4 in the direction of the arrows as indicated in Fig. 3;

Fig. 5 is a perspective view of the wedge portion of the assembly and illustrating an alternative form of construction;

Fig. 6 is a sectional side view of another form of unit; and

Fig. 7 is a transverse view along line 7—7 of Fig. 6 and in the direction of the arrows.

Referring primarily to Figs. 1 through 4, 10 indicates an enclosing sleeve or member which is to be applied to a cable 11 in order to secure the latter against shifting. The member 10 is conveniently U-shaped in section so that a space 12 is defined between its arms and through which access may be had to its bore 13. This sleeve is tapered lengthwise so that it includes a relatively enlarged end portion 14 and a reduced end portion 15. Between these end portions a wedge element, generally indicated at 16, is normally disposed.

This element conveniently includes a lower head 17 which is defined by grooves 18. These grooves receive flanges 20 formed at the free edges of member 10. The body of element 16 embraces a lower portion 21 adjacent grooves 18 and an upper portion 22. Between these parts a bore 23 is formed which is continued in a forward direction as a passage 24 of reduced area. These portions throughout one side face of element 16 are interrupted as indicated at 26. Therefore, by lateral movement access may be had to the spaces defined by them.

A coupling member in the form of a woven cable 27 has one of its ends anchored within head portion 17. This may be effected by constricting that head portion around the cable. The latter will normally continue in a forward direction, as shown in Fig. 2 and thereupon it will be reversed upon itself to extend through bores 24 and 23. Within the latter, this cable has secured to it a preferably cylindrical unit 28. The diameter of that unit is less than that of bore 23, but greater than bore 24. The space defined by the bore of member 10 at a point, for example, midway between its ends 14 and 15 will be equal to the aggregate height of wedge element 16 above the grooves 18 of the latter plus the diameter of cable 11.

In use it will be understood that when the anchoring device is to be employed wedge element 16 will be removed from its interior. Such removal is desirably effected by shifting the body of that element towards and beyond end 14 of member 10. The distance between flanges 20 and defined by slot 12 is such that this member may readily be applied to cable 11 so that the latter rests against the inner face of the U-base, as shown in Figs. 1 through 4. Cable 27 may now either be passed under a cable 31 or the latter may be passed around the loop 30 of the former.

In any event, cylindrical unit 28 is shifted to occupy bore portion 23. This may be effected by laterally displacing this unit and the adjacent part of cable 27 so that they respectively occupy bores 23 and 24. Otherwise, with cable 27 within bore 24, unit 28 may be shifted in a direction paralled to the axis of the bores so that it finally comes to rest in the position shown in Fig. 2.

Now as a pulling strain is imposed by strand 31, or its equivalent, upon strand 27, as indicated by arrow 32, wedge element 16 will be drawn in a forward direction (to the left as in Figs. 1, 2 and 3) incident to its grooves 18 being engaged by flanges 20 of member 10. With such shifting of the parts the upper portion 22 of the wedge element will engage the underface of cable 11. The latter will accordingly be pressed against the base of the U provided in cross section by member 10. The greater the strain on strand 27, the more the wedge effect will occur. Accordingly, cable 11 will be even more tightly gripped. It is, of course, apparent that the adjacent surfaces of portion 22 and member 10 might be suitably conditioned to even enhance this gripping action.

When it is desired to release the parts, this may readily be achieved. The procedure will of course involve a relief of the strain on strand 27. Thereupon unit 28 may be withdrawn from bore portion 23 as shown in Fig. 3. By exerting a pull in the direction of the arrow 33, shown in this figure, a force of any desired value can be exerted upon wedge element 16. This will result in a release of the latter as it shifts down the trackways provided by flanges 20 and towards end 14 of the sleeve 10. With such movement the gripping action on cable 11 will be nullified. Of course, any suitable tool might be inserted into the bore of member 10 through the reduced end 13 thereof and that tool might be tapped with a hammer to even more readily shift the wedge element in a "release" direction with respect to the sleeve.

In any event, the wedge element will preferably be completely removed from the bore of the member. Thereafter, the latter may be lifted to cause cable 11 to pass through the slot 12 between the flange portions 20. Consequently the anchoring device may now be used in a future location as desired by the operator.

The wedge element as shown in Fig. 5 may, in effect, be a duplicate of the element 16. It includes a forward face 34, an upper body portion 35, a lower body portion 40 and a head 43. Secured to the latter is a strain-supporting element which may be in the form of a rod or tube shown at 36. This tubing is bent to provide a loop 37 and thus reverses upon itself to extend through bore 40, corresponding to bore 24, and into enlarged bore section 39, corresponding to the cavity 23, as described. At this point it has attached to it a unit 38 which may be substantially identical with unit 28.

As will be apparent in connection with this structure, the tubing will normally exert a strain on the wedge element incident to a pull being exerted in a direction reverse to that indicated by arrow 42. Such strain will cause the element to shift toward the reduced end portion 13 of a member 10 and whether grooves 18 are employed or whether the base portion of part 39 simply rides against the inturned flanges 20 of the sleeve. Of course, by exerting a thrust on tubing 36 in the direction indicated by the arrows in Fig. 5, the wedge element may be shifted rearwardly within the sleeve and toward its enlarged end 14 to free cable 11 of restraint in the manner previously described.

In the form of construction shown in Figs. 6 and 7, a reversible type wedge and assembly is employed. In other words, it will not be necessary to use care so that the wedge is inserted in the sheath or tube in only a predetermined manner. Thus, in these views the numeral 44 again indicates the body of a slotted sleeve of tapered configuration. In common with the preceding forms, this sleeve has the ends of the arms which define its U-shaped body terminating in inwardly-extending flanges 45. Its inner base face preferably includes a serrated surface 46 involving a number of transversely-extending teeth which are engageable with the surface of the cable 11. This same construction may, of course, be included in the sleeves as previously described. The wedge will comprise a body 47, which is also preferably tapered, and has its upper and lower edges defined by reduced or extended portions 48. These will be of sufficiently restricted area, so that they may be slidably accommodated between the flanges 45. An anchoring unit such as a cable may comprise a loop formed of metallic strand material 49, which may pass through or around an anchoring member. The end of the loop is preferably accommodated in the groove of a grommet 50 slidably mounted upon the strands 49.

As will be apparent, with an assembly of this character, the cable 11 is introduced into the bore of the sleeve 44. The wedge 47 is shifted with respect to the sleeve so that its reduced end will desirably project beyond the smaller end of the sleeve, as shown in Fig. 6. It is immaterial whether the wedge has one or the other of its reduced edges disposed between the flanges 45, which thus act as rails to guide the sliding movement of this member. In any event, the upper edge of the wedge will bear against cable 11 under conditions of strain. So bearing, it will clamp that cable against movement with respect to the sleeve. The anchoring loop or bail provided by the strands 49 may, of course, be passed around any suitable mounting or securing element, at any stage of the assembly. It is again apparent that this anchoring device will serve to retain the cable against displacement. At the same time, the parts may readily be loosened when this is necessary. Finally, it will be understood that if the strand material, such as 49, is employed, it may be anchored against movement with respect to the wedge body by constricting the head around the end of the strand material, in the same manner as heretofore described in connection with Fig. 4.

Thus, among others, the several objects of the invention as specifically aforenoted are achieved. Obviously, numerous changes in construction and rearrangement of the parts may be resorted to without departing from the spirit of the invention as defined by the claim.

I claim:

An anchoring device including in combination a sleeve comprising a base, parallel side walls extending perpendicular to said base and from opposite edges thereof, inwardly projecting flanges at the outer ends of said side walls and having their opposed edges spaced from each other, said sleeve being longitudinally tapered, a reversible wedge comprising a tapered body having side faces slidably bearing against the inner surfaces of said side walls, opposite edges forming a part of said body and longitudinally extending reduced portions projecting outwardly from such edges, one of said portions extending toward said base and the other of the same extending between and slidably bearing against the opposed edges of said flanges, the reduced end of said wedge being extensible beyond the constricted end of said sleeve and a cable having a part embedded within said wedge and extending beyond its reduced end.

References Cited in the file of this patent

UNITED STATES PATENTS

| | | |
|---|---|---|
| 482,975 | Cope | Sept. 20, 1892 |
| 809,601 | Baker | Jan. 9, 1900 |
| 904,863 | Glass et al. | Nov. 24, 1908 |
| 1,639,609 | Hofland | Aug. 16, 1927 |
| 1,718,912 | Wright | June 25, 1929 |
| 2,180,977 | Cook | Nov. 21, 1939 |
| 2,454,064 | Johnson | Nov. 16, 1948 |
| 2,472,527 | Gordon | June 7, 1949 |
| 2,676,376 | Kellems | Apr. 27, 1954 |
| 2,835,949 | Wengen et al. | May 27, 1958 |

FOREIGN PATENTS

| | | |
|---|---|---|
| 2,414 | Great Britain | 1878 |
| 35,118 | Sweden | July 9, 1913 |
| 58,747 | Austria | Apr. 25, 1913 |
| 111,139 | Switzerland | July 16, 1925 |
| 163,371 | Switzerland | Oct. 16, 1933 |